United States Patent
Suzuki et al.

(10) Patent No.: US 10,496,242 B2
(45) Date of Patent: Dec. 3, 2019

(54) OPERATION SCREEN DISPLAY DEVICE AND RECORDING MEDIUM RECORDED WITH DISPLAY PROGRAM

(71) Applicant: Konica Minolta, Inc., Chiyoda-ku, Tokyo (JP)

(72) Inventors: Yoriko Suzuki, Yokohama (JP); Daiki Nishioka, Hino (JP); Kazuhisa Kishimoto, Mitaka (JP)

(73) Assignee: KONICA MINOLTA, INC., Tokyo (JP)

( * ) Notice: Subject to any disclaimer, the term of this patent is extended or adjusted under 35 U.S.C. 154(b) by 541 days.

(21) Appl. No.: 14/856,107

(22) Filed: Sep. 16, 2015

(65) Prior Publication Data
US 2016/0085382 A1    Mar. 24, 2016

(30) Foreign Application Priority Data

Sep. 19, 2014   (JP) .................. 2014-190845

(51) Int. Cl.
*G06F 3/0482* (2013.01)
*G06F 3/0488* (2013.01)

(52) U.S. Cl.
CPC ........ *G06F 3/0482* (2013.01); *G06F 3/04883* (2013.01); *G06F 2203/04806* (2013.01)

(58) Field of Classification Search
CPC .................................................. G06F 3/0482
See application file for complete search history.

(56) References Cited

U.S. PATENT DOCUMENTS

| | | | | |
|---|---|---|---|---|
| 6,489,975 B1* | 12/2002 | Patil | ...................... | G06F 3/0481 715/779 |
| 6,738,075 B1* | 5/2004 | Torres | .................. | G11B 27/034 348/333.05 |
| 7,618,319 B2* | 11/2009 | Casey | ................. | G07F 17/3232 273/274 |
| 2005/0060665 A1 | 3/2005 | Rekimoto | | |
| 2005/0149863 A1* | 7/2005 | Kato | .................... | G09B 21/001 715/274 |

(Continued)

FOREIGN PATENT DOCUMENTS

| | | |
|---|---|---|
| JP | H05-282116 A | 10/1993 |
| JP | A-H08-263255 | 10/1996 |

(Continued)

OTHER PUBLICATIONS

Notice of Reason for Refusal dated Nov. 14, 2016 for JP Application No. 2014-190845 with English translation; total of 9 pages.

*Primary Examiner* — William L Bashore
*Assistant Examiner* — Nathan K Shrewsbury
(74) *Attorney, Agent, or Firm* — Squire Patton Boggs (US) LLP

(57) ABSTRACT

An operation screen display device according to the present invention displays operation screens which have a hierarchical structure on a display surface, and displays a lower level window, in which a region of at least a part of an operation screen of a lower level layer associated with an operation key which is performed with a pinch out operation is displayed, on a display surface at a specified size based on a size specified with the pinch out operation by a user for any of a plurality of operation keys in the operation screen.

22 Claims, 9 Drawing Sheets

(56) References Cited

U.S. PATENT DOCUMENTS

| | | | |
|---|---|---|---|
| 2006/0184894 A1* | 8/2006 | Daniels | G06F 3/0482 715/783 |
| 2007/0061150 A1* | 3/2007 | Sawano | G07C 9/00158 704/275 |
| 2007/0250788 A1* | 10/2007 | Rigolet | G06F 3/0481 715/788 |
| 2007/0299750 A1* | 12/2007 | Aoki | G06Q 10/0875 705/29 |
| 2008/0307350 A1* | 12/2008 | Sabatelli | G06F 3/0481 715/779 |
| 2011/0164057 A1* | 7/2011 | Prabhu | G06F 3/017 345/650 |
| 2012/0278712 A1* | 11/2012 | Wright | G06F 3/04883 715/702 |
| 2013/0254705 A1* | 9/2013 | Mooring | G06F 3/0488 715/784 |
| 2013/0321340 A1* | 12/2013 | Seo | G06F 1/1641 345/174 |
| 2014/0052763 A1* | 2/2014 | Sato | G06F 3/0488 707/805 |
| 2014/0071099 A1* | 3/2014 | Kubota | G09G 5/006 345/179 |
| 2014/0137036 A1* | 5/2014 | Han | G06F 3/0482 715/798 |
| 2016/0085382 A1* | 3/2016 | Suzuki | G06F 3/04883 715/783 |

FOREIGN PATENT DOCUMENTS

| | | |
|---|---|---|
| JP | 2000-056890 A | 2/2000 |
| JP | 2005-004396 A | 1/2005 |
| JP | 2013-131193 A | 7/2013 |
| JP | 2014-035603 A | 2/2014 |

* cited by examiner

OPERATION SCREEN DISPLAY DEVICE AND RECORDING MEDIUM RECORDED WITH DISPLAY PROGRAM

CROSS-REFERENCE TO RELATED APPLICATION

This application is based on Japanese Patent Application No. 2014-190845 filed on Sep. 19, 2014, the contents of which are incorporated herein by reference.

BACKGROUND

1. Technical Field

The present invention relates to operation screen display devices, display methods, and recording media which stores a display program, and in particular, to an operation screen display device for displaying an operation screen which has a hierarchical structure, and a recording medium which stores a display program.

2. Description of Related Arts

In an image forming apparatus, with regards to the setting of a function, an image such as an icon corresponding to each function is displayed on an operation panel and the relevant image is selected to select the desired setting or set a predetermined condition. However, as the setting items increase with multi-functionalizing of the device, it becomes difficult to arrange all the icons corresponding to all the functions within one operation screen. A method for configuring the operation screen in a hierarchical structure has been provided for such problem. According to such method, the desired operation is carried out by switching a screen to a lower-level operation screen depending on the selection of an icon in the operation screen of an upper-level hierarchy.

If the hierarchical structure extends over multiple stages, however, a plurality of hierarchies need to be displayed back and force to search for the desired image as it is difficult to grasp the entire hierarchical structure. In such a case, techniques of dividing the display region into a plurality of regions, and assigning an icon of every hierarchy to each region in the displayable manner, where the displayed icons are in the simplified manner such that the deeper the hierarchy, the smaller the size becomes, so that a plurality of hierarchies can be simultaneously displayed (patent document 1 (Japanese Laid-Open Patent Publication No. 08-263255)).

However, in the technique disclosed in patent document 1, the display region to assign for every hierarchy needs to be ensured in advance, and it is difficult to ensure a sufficiently wide region in advance to display on a display that is not very wide. Furthermore, the visibility may be insufficient as the icon of a deep hierarchy is displayed small.

In light of the foregoing, it is an object of the present invention to display an operation screen of a lower level layer while ensuring sufficient visibility without ensuring the display region in advance.

SUMMARY

To achieve at least one of the abovementioned objects, an operation screen display device reflecting one aspect of the present invention includes a display control unit that displays one of a plurality of operation screens having a hierarchical structure on a display surface of the display unit, and an input unit that accepts an operation by a user; wherein when the input unit accepts a predetermined operation for any of a plurality of images in the operation screen, the display control unit displays a lower level window, in which a region of at least a part of an operation screen of a lower level layer associated with the image which is performed with the predetermined operation is displayed, on the display surface at a size specified according to the predetermined operation.

DETAILED DESCRIPTION

Figure 1:
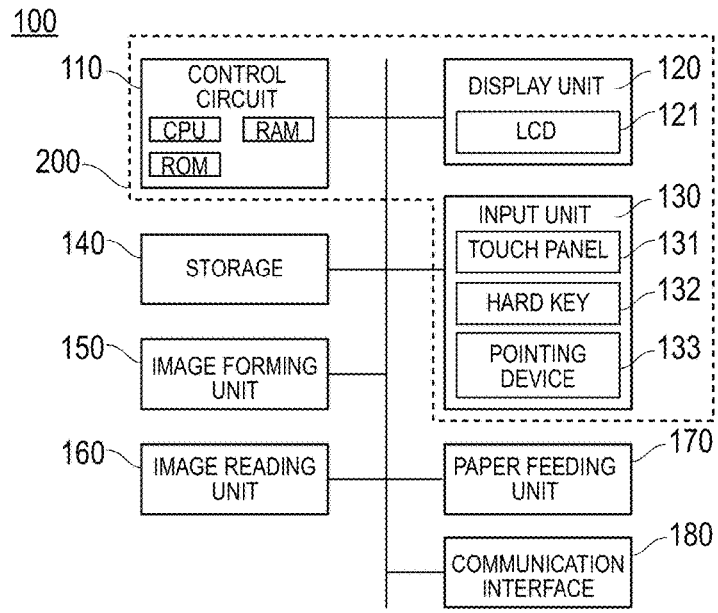
FIG. 1 is a block diagram showing a hard configuration of an image forming apparatus 100 including an operation screen display device 200 according to an embodiment of the present invention.

Embodiments of the present invention will be hereinafter described with reference to the accompanying drawings. The same reference numerals are denoted on the same elements in the description of the drawings, and redundant descriptions will be omitted. In addition, dimensional ratios in the drawings are exaggerated for descriptive convenience and may be different from actual ratios.

First Embodiment

Figure 2:
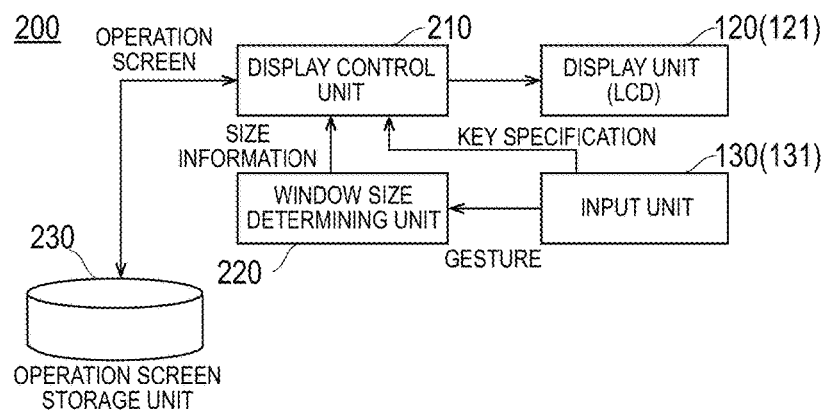
FIG. 2 is a block diagram showing a function configuration of the operation screen display device 200.
Figure 3:
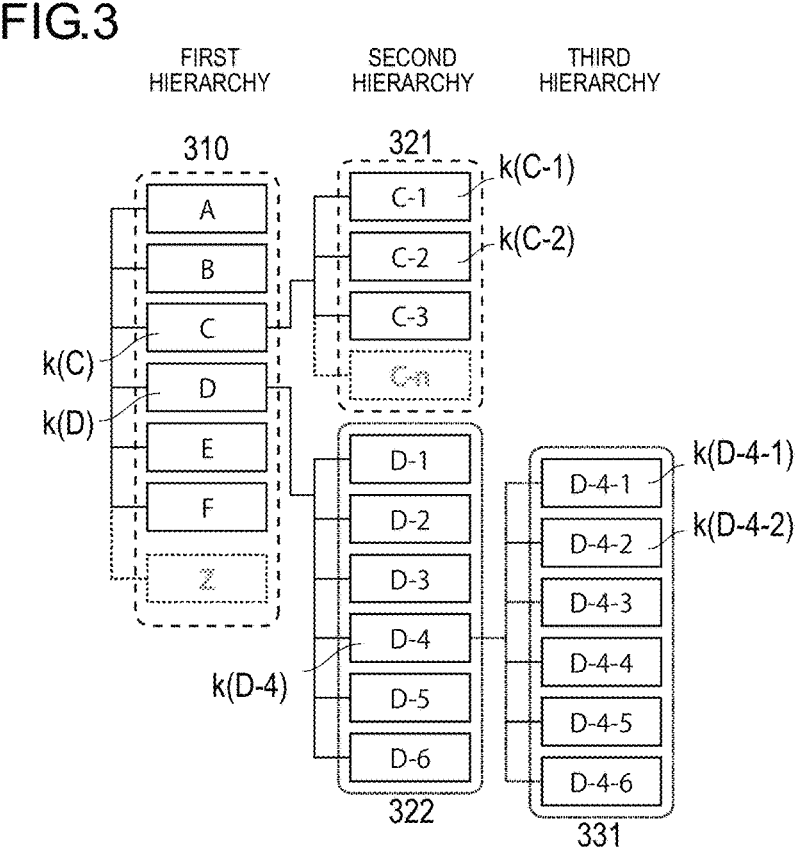
FIG. 3 is a view showing a hierarchical structure of an operation screen.

FIG. 1 is a block diagram showing a hard configuration of an image forming apparatus 100 which includes an operation screen display device 200 according to an embodiment of the present invention, and FIG. 2 is a block diagram showing a function configuration of the operation screen display device 200. FIG. 3 is a view showing a hierarchical structure of an operation screen to display on the operation screen display device 200.

As shown in FIG. 1, the image forming apparatus 100 includes a control circuit 110 with a CPU, a RAM, and a ROM, a display unit 120, an input unit 130, a storage 140, an image forming unit 150, an image reading unit 160, a paper feeding unit 170, a communication interface 180, and the like.

The control circuit 110 controls the entire image forming apparatus 100 according to various programs stored in the ROM and the storage 140. As will be described later, the control circuit 110 also functions as the operation screen display device 200 by cooperatively operating with the display unit 120, the input unit 130, and the like.

Figure 4:
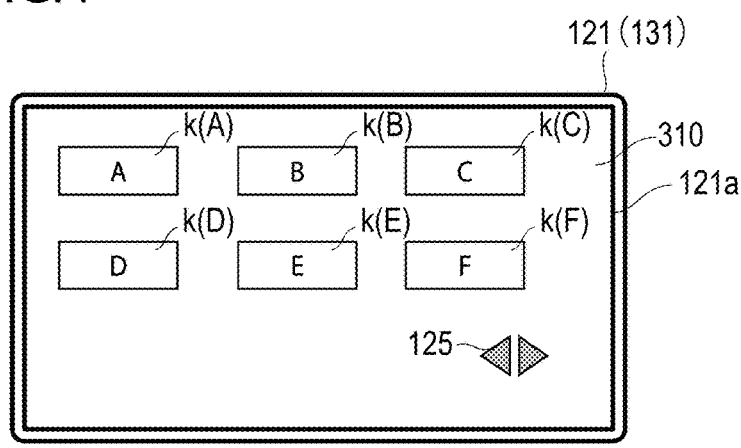
FIG. 4 is a display example of an operation screen 310 of a first hierarchy.

The display unit 120 includes an LCD (Liquid Crystal Display) 121, and displays an operation screen on a display surface 121a (see FIG. 4).

The input unit 130 includes a touch panel 131 arranged superimposed on the display screen 121a of the LCD 121, a hard key 132 composed of a keyboard, a ten key, and the like, and a pointing device 133 such as a mouse. The touch panel 131 is an interface that enables a multi-touch operation, which is a simultaneous operation by a plurality of fingers, and is able to accept a gesture operation by detecting presence or absence of touch with one or more of fingers of the user or a touch pen and a touch position (coordinate) thereof.

The storage 140 is composed of a semiconductor memory, a hard disc drive, and the like, and stores an operation program and other programs, as well as data related to the control of the image forming apparatus 100.

The image forming unit 150 prints an image based on image data on a recording medium such as paper, and the like, using a well-known image creating process such as an electro-photographic process including each step of charging, exposure, development, transfer, and fixation. The image reading unit 160 irradiates a document set at a predetermined reading position or a document transported to the predetermined reading position by an ADF with light from a light source such as a fluorescence lamp, converts the reflected light photo-electrically with an imaging device such as a CCD image sensor, and generates the image data from an electrical signal. The created image data is stored in the storage 140.

The paper feeding unit 170 accommodates the recording medium such as paper used for printing, and feeds the accommodated papers by one sheet at a time to the image forming unit 150.

The communication interface 180 is an interface for communicating with other devices such as a PC (Personal Computer), and standards such as Ethernet (registered trademark), Bluetooth (registered trademark), IEE802.11 (Wi-Fi), Home RF (Home Radio Frequency), IrDA (Infrared Data Association) and FDDI (Fiber-distributed data interface) are used. An interface for USB communication may also be provided.

As shown in FIG. 2, the operation screen display device 200 includes the display unit 120 and the input unit 130, as mentioned above, and also a display control unit 210, a window size determining unit 220, and an operation screen storage unit 230. The display control unit 210 and the window size determining unit 220 are functions accomplished with the control circuit 110 as a computer for executing an operation screen displaying program. The operation screen storage unit 230 is a function accomplished with the ROM of the control circuit 110 or the storage 140.

The display control unit 210 controls a screen to be displayed on the display screen 121a of the LCD 121. The operation screen storage unit 230 stores a plurality of operation screens which have a hierarchical structure. An example of the operation screen will be described later.

The window size determining unit 220 determines whether or not a gesture received from the input unit 130 is the predetermined gesture operation according to the signal corresponding to the touch position and the movement thereof by the user, and also determines a window size according to the gesture operation. For example, if the operation of pinch-out by the user is performed on the touch panel 131, the window size is determined based on operation amounts such as the traveling distance and the temporal position change (speed, acceleration) of each position of two fingers relative to each position touched by the two fingers at first (initial contacting position). The greater the operation amount of the pinch-out operation becomes, the larger the window size is determined.

The display control unit 210 acquires the operation screen of the lower level layer associated with the specified image from the operation screen storage unit 230, based on the signal which specifies the image (operation key) in the operation screen such as the touch position (coordinate) received from the input unit 130. The acquired operation screen is then displayed on the display screen 121a of the display unit 120 at the size corresponding to the size information from the window size determining unit 220.

The operation screen will be described with reference to FIGS. 3 to 5. FIG. 3 is a view showing a hierarchical structure of the operation screen. FIG. 3 shows an example of a hierarchical structure of three layers, where one operation screen 310 is provided in a first hierarchy of the uppermost level, operation screens 321 and 322 of a second hierarchy are provided in one level lower, and an operation screen 331 of a third hierarchy is provided in further one level lower. Each operation screen includes one or a plurality of images. Such image is referred to as a so-called icon, and is an operation key for carrying out setting and selection of a plurality of functions that can be executed in the image forming apparatus 100. Hereinafter, an image arranged in such operation screen is simply referred to as an "operation key", but the type of image is not limited to the operation key, and may be an image that represents the type of data such as photo data and document data, or a file name that specifies the relevant data saved in the storage 140. In the operation screens shown in FIG. 3, only some operation screens and operation keys are illustrated for simplification, but actually, the operation key k of each operation screen has a hierarchical structure of four or more layers in a tree-form to which the respective operation screen is associated.

As shown in FIG. 3, the operation screen 310 of the first hierarchy (uppermost level layer) is, for example, composed of 26 images A to Z. The operation key k of each hierarchy is corresponded to at least one of the operation keys of the operation screen of the upper level hierarchy and the operation screen of the lower level hierarchy. The operation keys k(C) and k(D) of the operation screen 310 of the first hierarchy are associated with the operation screens 321 and 322 of the second hierarchy, respectively. The operation key k(D-4) of the operation screen 322 of the second hierarchy is associated with the operation screen 331 of the third hierarchy.

When the operation key of the operation screen, for example, the operation key k(C) of the operation screen 310 corresponded to the operation screen of the lower level hierarchy is selected by the user, the display control unit 210 displays the corresponding operation screen 321 of the lower level. When the operation key k, for example, the operation key k(D-4-1) or the operation key k(C-1) of the operation screen 331 which are not corresponded to the operation screen of the lower level are selected, the control circuit 110 executes a process associated with the selected operation key k. The associated process includes a process of executing the setting of the paper size and the setting of the two-sided printing mode, or opening the document data and the image data associated with the operation key k.

FIG. 4 is a view showing a display state of the operation screen 310 of the first hierarchy. The operation screen 310 is displayed on the display surface 121a of the LCD 121, on which the touch panel 131 is superimposed. In the operation screen 310 shown in the figure, some operation keys k (k(A) to k(F)) are displayed. The operation screen 310 is scrolled to the left and right depending on the number of times a triangular button 125 displayed on the display surface 121a is touched by the user to switch to the display of other operation keys k (k(G) to k(Z)).

Figure 5:
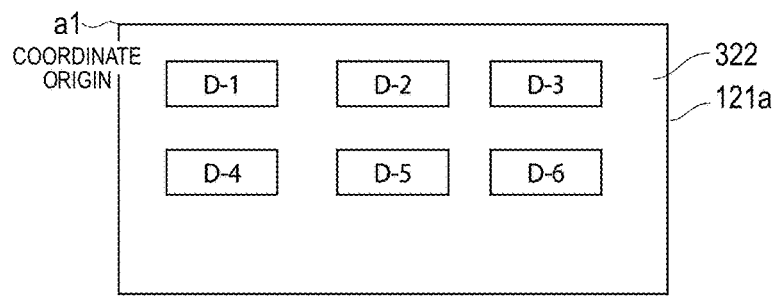
FIG. 5 is a display example of an operation screen 322 of a second hierarchy.

FIG. 5 is a view showing a display state of the operation screen 322 of the second hierarchy. As shown in FIG. 3, the operation screen 322 is associated with the operation key k(D), and is the operation screen of the lower level layer than the operation screen 310 including the relevant operation key k(D).

Now, a procedure of displaying a lower level window W will be described with reference to FIGS. 6A to 6D and FIG. 7. In the following description, when showing the lower level window corresponding to the specific operation screen 321, the corresponding operation screen is notated within the parentheses such as "lower level window W (321)", and when showing the overall operation screen, the notation without the parentheses such as "lower window W" is made. This is similar for the operation keys k.

Figure 6A:
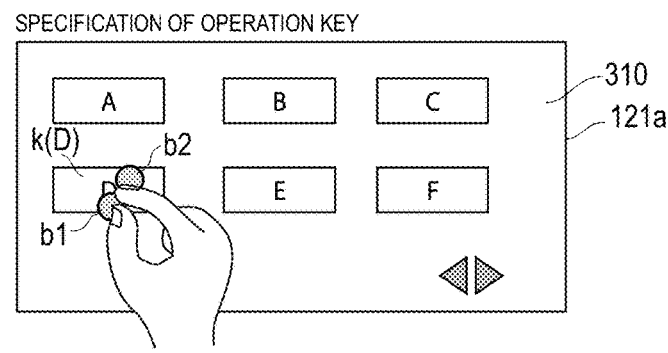
FIGS. 6A to 6D are views showing a transition in a display state when a pinch-out operation is performed.

FIGS. 6A to 6D show the transition of the display state of the screen corresponding to one gesture operation. In such figures, a case in which the pinch-out operation is performed as a predetermined gesture operation to the operation key k(D) is shown by way of example. FIG. 6A is a view corresponding to FIG. 4, and shows a state in which the user starts to touch the operation key k(D) with two fingers while displaying the operation screen 310 of the first hierarchy on the display surface 121a as an initial screen. Hereinafter, the black circles b1 and b2 indicate the touch positions on the touch panel 131 corresponding to the two fingers, respectively, and the broken line arrows indicate the respective moving directions of the touch positions b1 and b2.

Figure 6B:
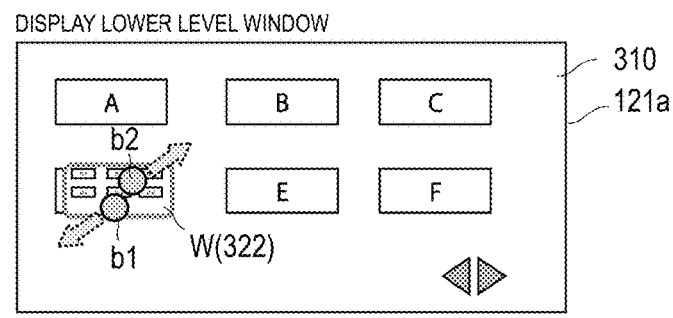
Figure 6C:
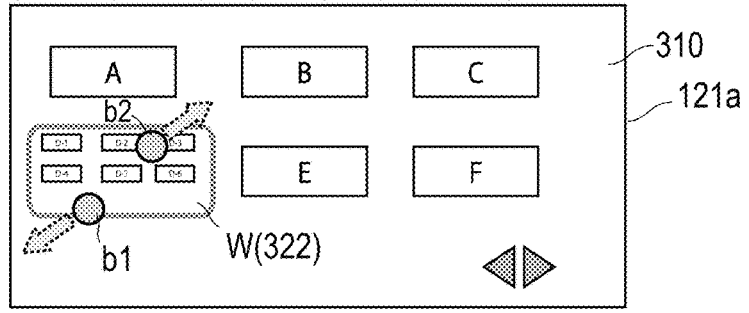

FIG. 6B is a view showing a state immediately after FIG. 6A, and at this time point, the touch positions b1 and b2 of the fingers are barely moved relative to FIG. 6A. In the figure, with the start of touching by the user in FIG. 6A, the lower level window W (322) is immediately displayed overlapping the operation key k (D), which is arranged immediately below the touch position. The operation screen 322 of the lower level associated with the operation key k (D) of the touch position is displayed in the lower level window W (322). In the example shown in the figure, the entire operation screen 322 is displayed in the reduced manner so that all of the plurality of operation keys included in the operation screen 322 can be fitted within the lower level window. The size of the window W (322) at this time is at a predetermined initial value. FIG. 6C shows the progression in the middle of the series of pinch-out operations following FIG. 6B. As the two touching fingers move away from each other while sliding, the size of the lower level window W (322) is displayed while being enlarged. At this time point, the touch is still continued and thus the size of the lower level window W (322) is not determined. FIG. 6C is a so-called preview display state.

Figure 6D:
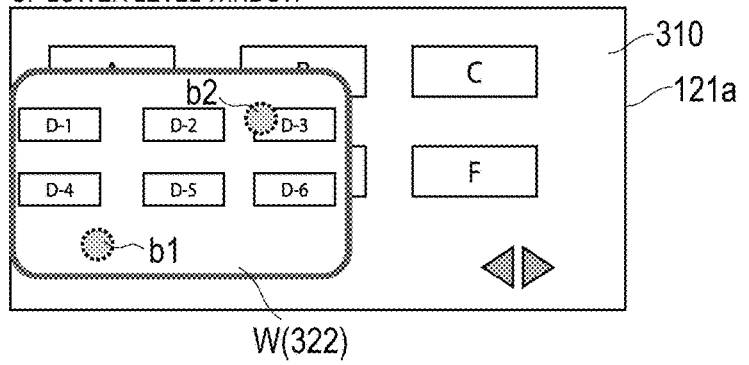

FIG. 6D is a view showing a state of the lower level window W (322) after the series of pinch-out operations is terminated and immediately after the two fingers left. With the termination of the pinch-out operation, the specification of the window size is confirmed, and thereafter, the display of the lower level window W (322) is maintained at the dimension corresponding to the specification of the confirmed size.

Variant

Figure 7:
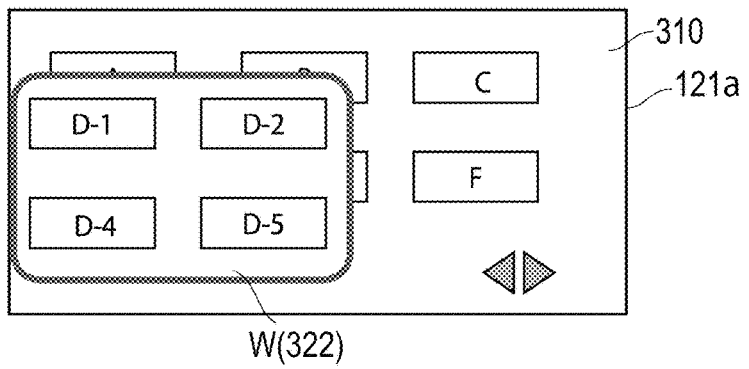
FIG. 7 is a view showing a display example of another mode of a lower level window W (322).

FIG. 7 shows a display example of another mode of the lower level window W (322). In the example of FIG. 6D, the entire operation screen 322 is displayed in the reduced manner so that all the operation keys k of the operation screen 322 are displayed in the lower level window W (322). On the contrary, in the variant of FIG. 7, each operation key k is displayed at the fixed magnification, for example, the magnification same as the dimension of when full-screen displayed shown in FIG. 5 (hereinafter referred to as "same magnification"), and a part of region or an entire region of the operation screen 322 corresponding to the size of the lower level window W (322) is displayed in the lower level window W (322). In the lower level window W (322) shown in FIG. 7, only a part of the region of the operation screen 322 in the arrangement shown in FIG. 5 is displayed. Various methods can be adopted to determine which portion of the operation screen 322 to be assumed as a part of the region. In the variant of FIG. 7, a coordinate origin (upper left corner (a1) of FIG. 5) of the operation screen 322 shown in the figure is arranged to overlap a coordinate origin (upper left corner) of the lower level window W (322), and hence the operation key closer to the coordinate origin is preferentially displayed.

The setting on whether to reduce and display the entire region of the operation screen as in FIGS. 6A to 6D or on whether to display a part of the region at the same magnification as in FIG. 7 is held in the storage 140, and such setting can be changed by the instruction by the user.

The display position of the lower level window W (322) relative to the display surface 121a is set to a position where the center position of the specified operation key k(D) of the upper level hierarchy and the center position of the lower level window W (322) are coincidental. However, if the edge (side) of the lower level window W (322) reaches the edge of the display surface 121a and runs out toward the outer side of the display region with enlargement in size, the center position of the lower level window W (322) is thereafter brought closer to the center side of the display region of the display surface 121. Thus, the entire lower level window W (322) is arranged within the display region (FIG. 6D).

Display Control of First Embodiment

A display control related to the display of the operation screen as described above will be described with reference to the flowchart of FIG. 8. The display control shown in the figure is executed mainly by the display control unit 210 and the window size determining unit 220 of the operation screen display device 200. First, the display control unit 210 displays the operation screen on the display surface 121a (S101). The operation screen in this case is, for example, the operation screen 310 of the first hierarchy.

Whether or not the touch operation is performed on any of the operation keys k(A) to k(F) is determined while the operation screen 310 is displayed (S102).

When the touch by the user is detected by the touch panel 131 (S102: YES), the window size determining unit 220 determines the type of operation (S103). When the touch is determined as the tap operation (S103: "tap operation") of touching the touch panel only once, the process associated with the operation key k corresponding to the coordinate of the touch position is executed (S104). This process can be carried out based on the known technique. For example, the process includes the process of closing the operation screen 310 displayed heretofore and transitioning the screen to the operation screen 321, which corresponds to the operation key k, of lower level associated with the operation key k, and the process of executing the setting of the paper size and the setting of the two-sided printing mode.

When it is determined that the type of operation carried out in succession to the touch operation is a predetermined gesture operation such as the pinch-out operation (S103: "predetermined gesture operation"), the window size determining unit 220 determines the window size based on the operation amount of the gesture operation (S105). The operation amount includes the movement amount of the two fingers relative to the initial contacting positions if, for example, the gesture operation is the pinch-out operation.

Then, the display control unit 210 determines the display content and the display position of the lower level window W as the other display conditions (S106). For the "display content", the operation screen of the lower level associated with the operation key k at the coordinate of the initial contacting position of the gesture operation is acquired from the operation screen storage unit 230 and is determined as the display content. For the "display position", the display position of the lower level window W is determined based on the center position of the operation key k and the display size of the lower level window W determined in step S105. If the lower level window W does not run out from the display surface 121a as described above, the center position of the lower level window W is coincided with the center position of the operation key k. If the center position of the lower level window W runs out as a result of coinciding the center positions, the center position of the lower level window W is brought closer toward the central side of the display surface 121a to the position of not running out from the display screen 121a.

The lower level window W displaying the operation screen of the lower level therein is displayed overlapping the operation screen of the upper level layer displayed heretofore based on the display conditions determined in steps S105 and S106 (S107). The operation screen to be displayed in the lower level window W in this case may display a part of the region at the same magnification (see FIG. 7) or may display the entire region in the reduced manner (see FIG. 6D).

Therefore, according to the present embodiment, when the input unit accepts a predetermined operation for any of a plurality of images in the operation screen, the lower level window, which displays the region of at least a part of the operation screen of the lower level layer associated with the relevant image, is displayed at the size specified according to the predetermined operation, so that sufficient visibility can be ensured when the operation screen of the lower level layer is displayed. More specifically, the user can specify the size by performing a predetermined gesture operation to the operation key on the operation screen displayed heretofore. The operation screen of the lower level layer associated with the operation key can be displayed at the specified size. Thus, the size of the lower level window for displaying the lower level layer can be easily set, and the visibility of the operation screen of the lower level layer to be displayed therein can be sufficiently ensured.

Second Embodiment

A second embodiment will now be described with reference to FIGS. 9 and 10. In the second embodiment, the configurations other than those shown in the figures are similar to those of the first embodiment shown in FIGS. 1 to 3, and the descriptions thereof will be omitted.

In the first embodiment, the user specifies the size of the lower level window W and the operation screen of the lower level which will be displayed therein through the gesture operation on the specific operation key k. In the second embodiment, on the other hand, when the "display selecting mode" is set to valid and the operation key k is specified by the user, the size of the lower level window W and the operation screen of the lower level to be displayed therein are specified. In this case, the size of the lower level window W is automatically determined by a window size determining unit 225 described below.

Figure 9:
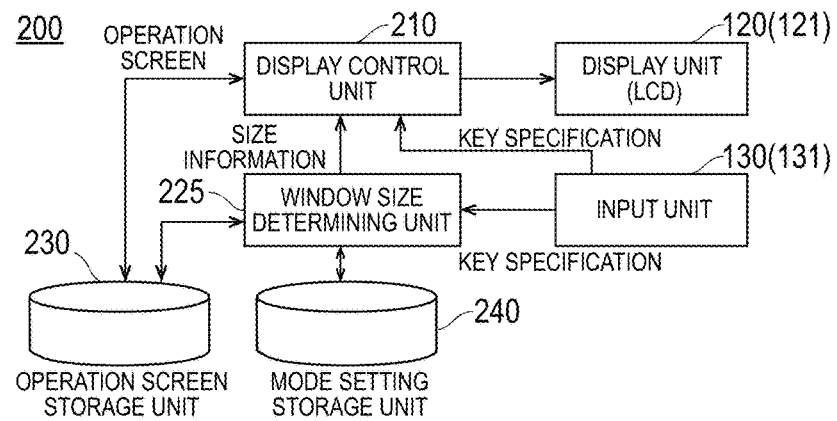
FIG. 9 is a block diagram showing a function configuration of the operation screen display device 200 according to a second embodiment.

FIG. 9 is a block diagram showing a function configuration of the operation screen display device 200 according to the second embodiment. A mode setting storage unit 240 holds the setting of either valid or invalid of the "display selecting mode" for displaying the lower level window W. The setting of the display selecting mode corresponds to any of the operation keys k (e.g., k(D-4-2)) of each operation screen shown in FIG. 3, and the user can switch the setting of valid/invalid by specifying the relevant operation key k.

The window size determining unit 225 determines whether the operation key k is specified based on a signal which indicates the touch position by the user received from the input unit 130. If the operation key k is specified, information on whether the "display selecting mode" is set to valid is acquired from the mode setting storage unit 240. If set to valid, the window size of the operation screen of the lower level corresponding to the specified operation key k is automatically determined.

Various methods can be adopted as the method for determining the window size by the window size determining unit 225. One of the methods is for assigning a fixed window size which is defined in advance. Other methods include a method for enabling the size specification by the user when the "display selecting mode" is set to valid, and the size is determined to the specified size. Such size specification may be applied to an individual size for each operation screen and for every hierarchy. Other methods may include acquiring the number of operation keys arranged in the operation screen of the lower level to be displayed in the lower level window W from the operation screen storage unit, and determining the size according to such number of operation keys or determining to the size corresponding to the depth of the hierarchy of the relevant operation screen.

In response to the operation to specify the operation key k together with the operation to set the display selecting mode to valid by the user as the predetermined operation, the information on the size determined by the window size determining unit 225 is transmitted to the display control unit 210.

The display control unit 210 acquires the operation screen of the lower level associated with the specified operation key from the operation screen storage unit 230, based on the signal specifying the operation key in the operation screen such as the touch position (coordinate) received from the input unit 130. Such operation screen is then displayed on the display surface 121a at the dimension corresponding to the size information received from the window size determining unit 225.

Display Control of Second Embodiment

A display control executed by the display control unit 210 and the window size determining unit 220 of the operation screen display device 200 in the second embodiment will be described with reference to FIG. 10. Steps S201 to S203, S205, and S207 to S209 in the figure correspond to steps S101 to S107 in the flowchart of FIG. 8, and hence the descriptions related to such processes will be omitted or kept to a minimum.

Figure 10:
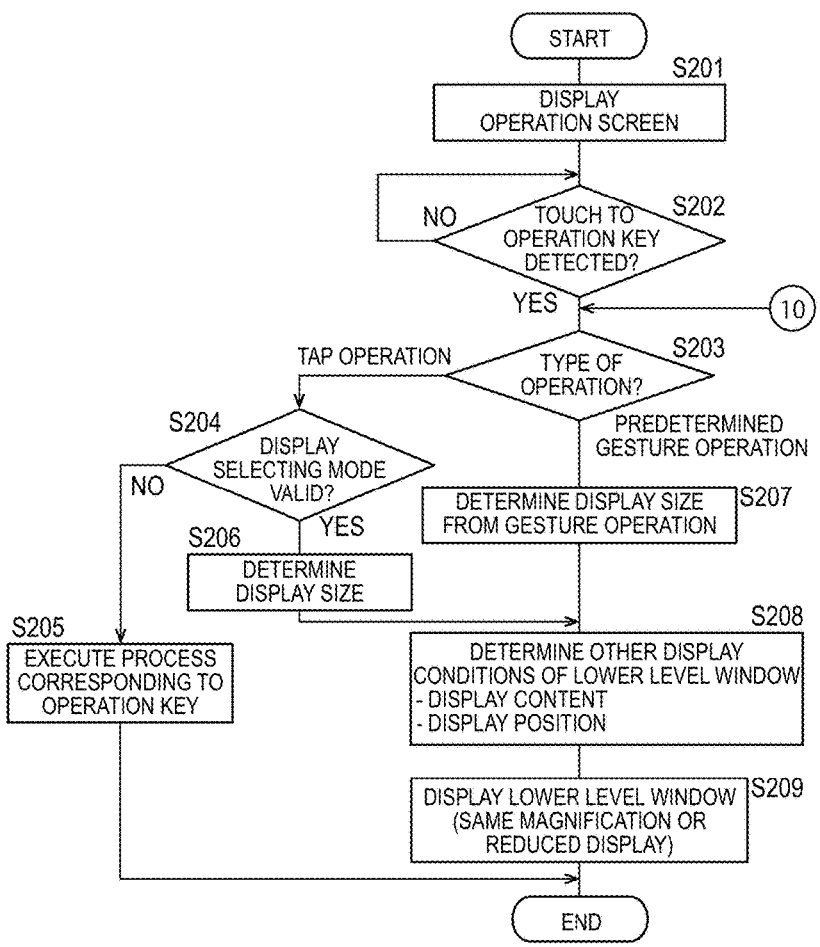
FIG. 10 is a flowchart showing a display control according to the second embodiment.

In the flowchart of FIG. 10, when the type of operation is the tap operation (S203: "tap operation"), whether or not the "display selecting mode" is valid is determined in the following S204. This is carried out, as described above, by acquiring a set value of the mode setting storage unit 240 by the window size determining unit 225. If the "display selecting mode" is not set to valid (S204: NO), the process corresponding to the operation key is executed (S205).

If the "display selecting mode" is set to valid, the window size determining unit 225 determines the display size (S206). Various methods can be adopted as the method for determining the display size, as described above, and one of which is for determining the size to the window size defined in advance.

The subsequent processes are similar to those of the first embodiment, and other display conditions are determined (S208), and the operation screen of the lower level is displayed in the lower level window W under the determined conditions (S209).

Display Control on Lower Level Window W

First Variant

Figure 8:
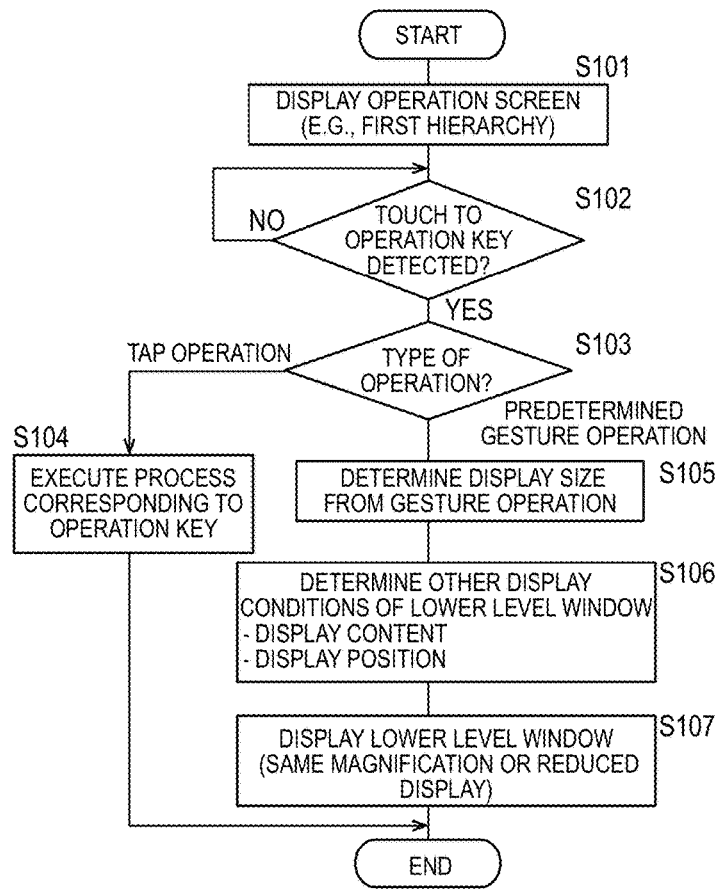
FIG. 8 is a flowchart showing a display control according to a first embodiment.
Figure 11:
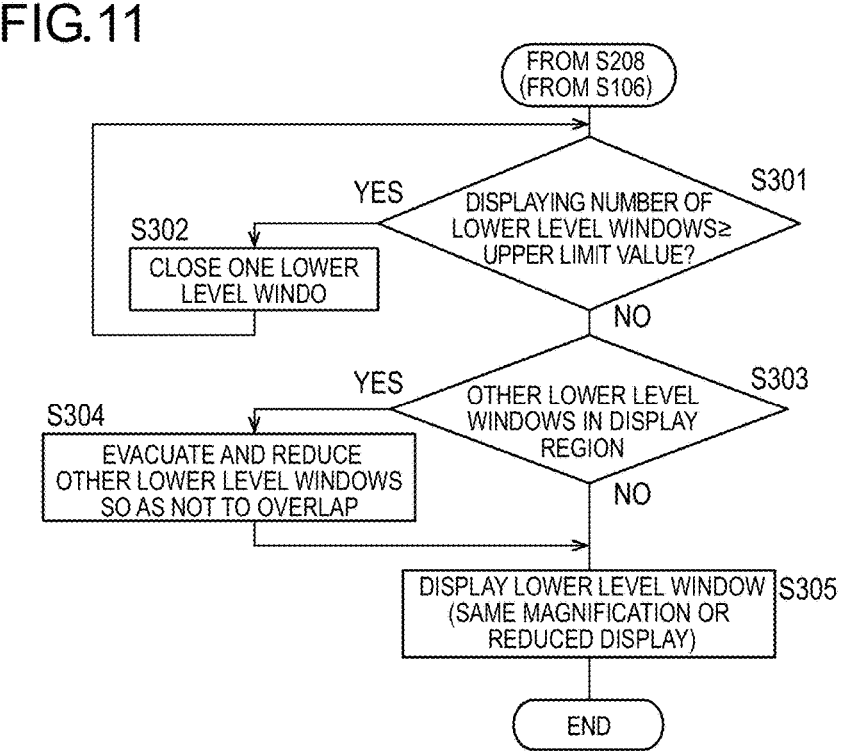
FIG. 11 is a flowchart showing a display control according to a first variant.

A flowchart shown in FIG. 11 shows a further display control when the display surface 121a further displays another lower level window W while already displaying the lower level window W by the display control of FIG. 8 or FIG. 10.

When displaying a new lower level window W, the display control unit 210 determines whether or not the number of lower level windows W displayed heretofore reached the upper limit value at the stage in which the display conditions are determined (S208 or S106). The upper limit value is, for example, three. The upper limit value is held in the storage 140, and the user can set it to an arbitrary number which is greater than or equal to one through the input unit 130.

When it is determined that the number of lower level windows W which are displayed on the display surface 121a at this time point reached the upper limit value (step S301: YES), the display control unit 210 selects and closes one of the lower level windows W (S302). Selection of lower level window from the plurality of lower level windows W which are displayed may be carried out by recording a time stamp at which the display started and closing from the lower level window W that started to be displayed the earliest, or closing from the lower level window displaying the operation screen having the lowest hierarchy.

When the displayed number of lower level window does not reached the upper limit value (S301: NO), whether or not another lower level window is displayed in a region, in which the new lower level window W will be displayed, is then determined in the display surface 121a (S303). If another lower level window is already displayed in the region for displaying, such lower level window is evacuated and reduced so as not to overlap the newly displayed lower level window W (S304).

Figure 12:
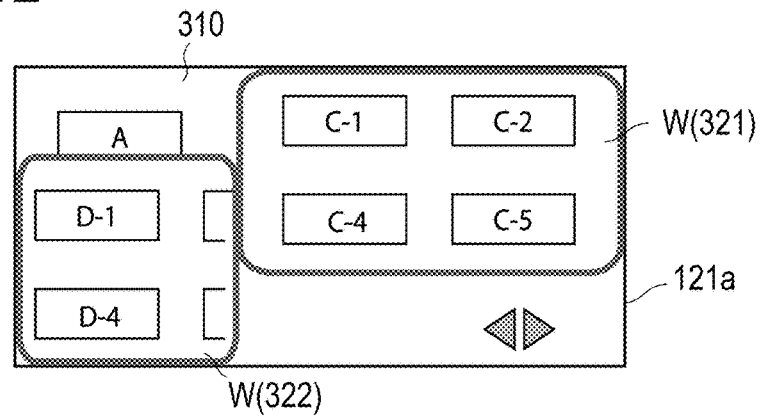
FIG. 12 is a view showing a state in which two lower level windows W are displayed.

FIG. 12 is a view showing a state in which two lower level windows W (321 and 322) are displayed on one display surface 121a. FIG. 12 is also a view showing a display state after a new lower level window W (321) is displayed following the state in which the lower level window W (322) is displayed as shown in FIG. 7. The two lower level windows W are in an exclusive arrangement positional relationship from each other and are not overlapped with each other. The new lower level window W (321) is displayed under the conditions determined by step S208, and the lower level window W (322) displayed heretofore is evacuated or reduced so as not to overlap the lower level window W (321).

Second Variant

Figure 13:
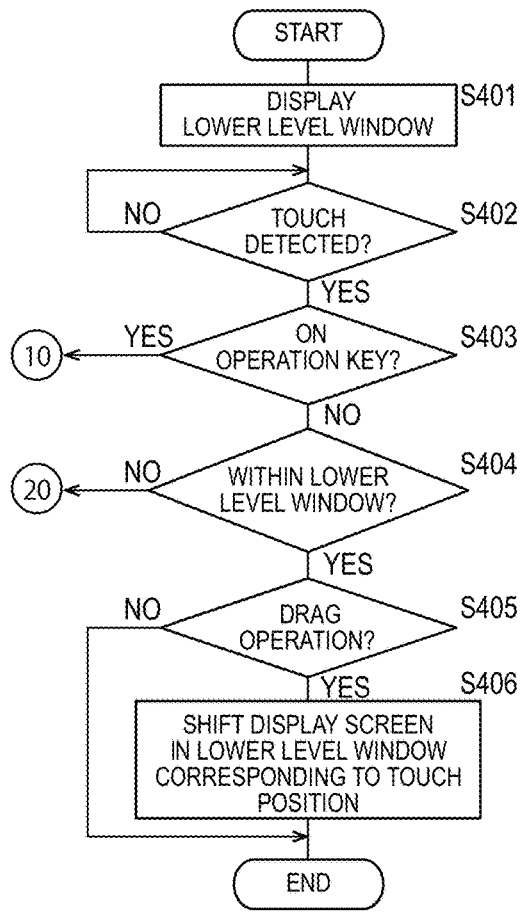
FIG. 13 is a flowchart showing a display control according to a second variant.

A flowchart shown in FIG. 13 shows a display control when the display state of the lower level window W is allowed to change while one or a plurality of lower level windows W is already displayed on the display surface 121a.

According to the process similar to that of step S209 (or S107, etc.), the display control unit 210 displays the lower level window W (S401), and when the touch operation on the touch panel 131 is detected in this state (S402: YES), the display control unit 210 determines whether or not the touch position is on the operation key k (S403). When the touch position is on the operation key k, the processes after step S203 (or S103) of FIG. 10 are executed.

When the touch position is not on the operation key k (S403: NO), whether or not the touch operation is the drag operation in the lower level window W is then determined (S404 to S405). When the touch position is determined as the drag operation of touching and sliding the finger on the lower level window W in a predetermined direction (YES in both S404 and S405), the operation screen in the lower level window W where the drag operation is performed is shifted (slide) according to the direction in which the drag operation is performed (S406).

Figure 14:
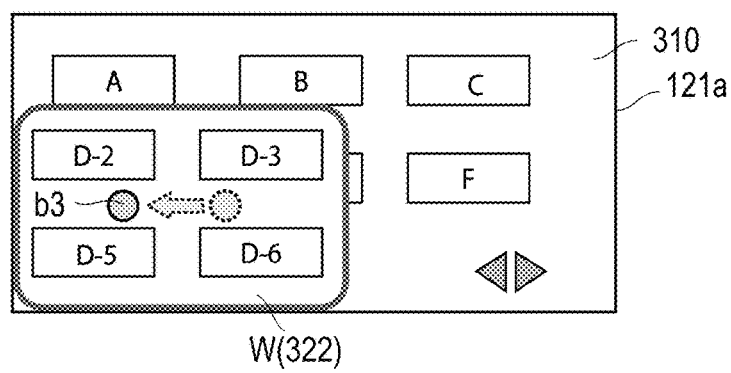
FIG. 14 is a view showing a display state after an operation screen in a lower level window W was shifted by a drag operation.

FIG. 14 is a view showing a display state after the screen is shifted by the drag operation. An initial screen (S401) before such figure is the display state of FIG. 7. In FIG. 14, the drag operation to slide the touch position b3 in the left lateral direction on the inner side of the displayed lower level window W (322) is carried out, and thus a state after the display region of the operation screen is shifted in the left lateral direction according to the shift direction of the drag operation is shown.

The visibility of the operation screen of the lower level layer which is displayed in the lower level window W displayed later can be ensured by carrying out the display control of the second variant. If the operation key k is cut off the outside of the lower level window W due to, for example, the reduction in the size of the lower level window W displayed hitherto, the visibility can be ensured by displaying the desired operation key k since the display region can be shifted by the drag operation.

Third Variant

Figure 15:
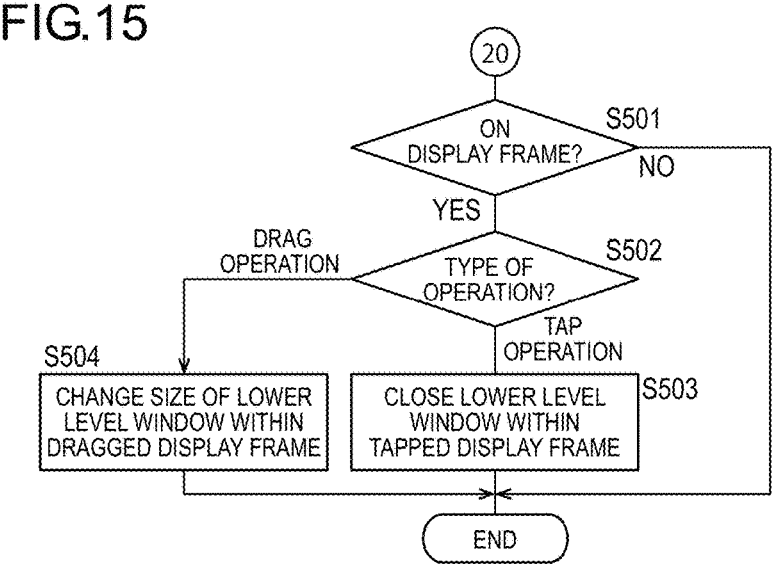
FIG. 15 is a flowchart showing a display control according to a third variant.

A flowchart shown in FIG. 15 shows a closing process or a size changing process to the lower level window W displayed. In the figure, the display control, which is carried out following a case in which the touch position is not on the operation key nor in the lower level window (NO in both S403 and S404) in the display control of FIG. 13, is shown.

If the touch position is on the display frame p which is arranged at the periphery of the lower level window W so as to surround the outer edge of the display region thereof (S501: YES), the type of operation is determined next (S502). If the type of operation is the tap operation, the process of closing the lower level window W within the display frame p at the tap position is carried out (S503), and if the type of operation is the drag operation, the size of the lower level window W within the display frame p is changed according to the operation amount of the drag operation (S504). This will be described below based on the display example of the screen.

Figure 16:
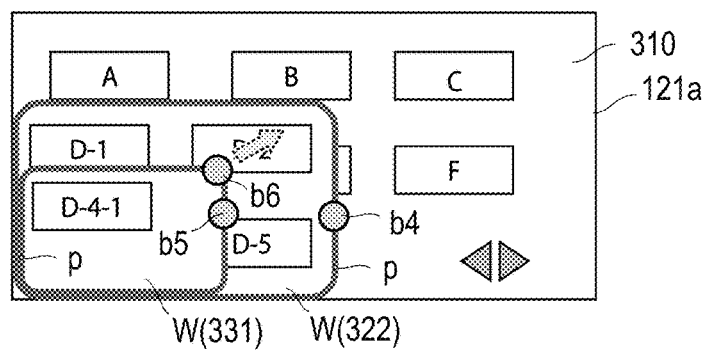
FIG. 16 is a view showing an operation on a display frame p of the lower level window W.

FIG. 16 is a view showing an operation on the display frame p of the lower level window W (322). As shown in the figure, if the touch position b4 by the user is on the display frame p of the lower level window W (322), and such operation is the tap operation, the display control unit 210 carries out the process to close the lower level window W (322). Similarly, if the operation is the tap operation on the display frame p of the lower level window W (331) which displays the operation screen 331 of the third hierarchy as the tap operation at the tap position b5, the lower level window W (331) is closed (S503).

If the operation is the drag operation toward the outer side of the diagonally right upper side relative to the display frame p as shown at the tap position b6, the lower level window W (331) is displayed in the enlarging manner in the diagonally right upward direction according to the drag direction and the operation amount of the drag operation (S504).

Thus, in each variant, a plurality of lower level windows W can be displayed in line relative to the lower level window W displayed, and furthermore, the display modes of the operation screens which are displayed in such lower level windows can be shifted, closed, or displayed in the enlarged manner easily according to the operation of the user. The sufficient visibility of the operation screen of the lower level layer thus can be ensured.

Other Variants

Fourth Variant

In the examples shown in FIGS. 11 and 12, when a plurality of lower level windows W are displayed in the display region of the display surface 121a, an example of displaying the lower level windows W so as to be exclusive to each other has been shown, but this is not the sole case, and the lower level window W which will be displayed after may be displayed overlapping the lower level window displayed hitherto. If the lower level window W which will be displayed after is the lower level window in a hierarchical relationship with the lower level window W displayed hitherto, such lower level window W may be displayed within the lower level window W of the upper level. In the display example shown in FIG. 16, the lower level window W (331) (second lower level window) is displayed within the display frame p of the lower level window W (322) of upper level.

Fifth Variant

When the lower level windows in such hierarchical relationship are simultaneously displayed, if the closing operation is carried out on the lower level window W of upper level, all the lower level windows W which are further lower level therefrom may also be closed at the same time. For example, when the closing operation is carried out to the lower level window W 322 of upper level in FIG. 16, the lower level window W (331) of lower level thereof is simultaneously closed. The display of the lower level window of the upper level layer thus becomes unnecessary, and when closing such lower level window, the lower level window of the lower level layer thereof often does not need to be continuously displayed. According to such control, the display state of the other display surfaces 121a can be organized, and the visibility of the other operation screens can be enhanced.

Sixth Variant

When one of the lower level windows W of the lower level in such hierarchical relationship is displayed in the enlarged manner, the lower level window W of the upper level on the outer side may be enlarged according to such manner. For example, when the operation to widen the display frame p of the lower level window W (331) of FIG. 16 than the lower level window W (322) of the upper level on the outer side is carried out, the widened lower level window W (331) may be enlarged and the lower level window W (322) on the outer side may also be enlarged.

Seventh Variant

In the first and second embodiments, an example of pinch-out operation on the touch panel 131 has been described for the gesture operation, but this is not the sole case, and the size of the lower level window W may be specified according to the distance of the drag operation. Furthermore, in place of the touch operation by the touch panel 131, the operation may be carried out with the pointing device such as a mouse, and the hard key. For example, the specification of the operation key k and the specification of the size, as well as the operation on the lower level window W abovementioned may be carried out by the drag operation and the click operation by the mouse or by combining the operation by the hard key with such operation.

Eighth Variant

In the example of FIG. 7 which displays the region of a part of the lower level window W at the same magnification, an example of arranging the coordinate origin (upper left corner a1 of FIG. 5) of the operation screen 322 of the lower level so as to overlap the coordinate origin (upper left corner) of the lower level window W (322) has been described, but this is not the sole case. The display region of the operation screen which is interiorly displayed may be changed according to the position relative to the display surface 121a of the lower level window W. For example, a method for arranging the operation screen 322 of the lower level in the positional relationship shown in FIG. 5 relative to the display surface 121a, and changing the display range according to the position and the size of the lower level window W is known. In this case, the lower level window W serves as a "peek hole" to peek the operation screen 322 arranged on the lower layer virtually. The display range of the operation screen 322 which is interiorly displayed can be changed by moving the lower level window W on the display surface 121a with the drag operation.

Ninth Variant

In the embodiments described above, the operation screen display device 200 is installed in the image forming apparatus 100. However, the present invention is not limited thereto. For example, in place of the image forming apparatus 100, the device may be applied to a smartphone, a tablet terminal, a camera, a video camera, a PDA (Personal Digital Assistant), a wearable display, an in-vehicle display, and the like.

The program executed by the computer of the operation screen display device 200 of the present invention may be provided by a non-transitory computer readable recording medium such as a Floppy (registered trademark) disc or a CD-ROM, or may be provided online through a network such as the Internet. In this case, the program recorded on the computer readable recording medium is normally transferred and stored in the ROM, the hard disc, and the like. Such program may, for example, be provided as a single application software or may be incorporated in the software of the apparatus as one function of the image forming apparatus.

What is claimed is:

1. An operation screen display device comprising:
   a display unit;
   a display control unit that displays any of a plurality of operation screens having a hierarchical structure on a display surface of the display unit; and
   an input unit that accepts an operation by a user; wherein
   when the input unit accepts a predetermined operation for any of a plurality of images in the operation screen, the display control unit displays a lower level window, in which at least a partial region of an operation screen of a lower level layer associated with the image for which the predetermined operation is performed is displayed, on the display surface at a size specified according to the predetermined operation,
   wherein a plurality of the lower level windows are displayable on the display surface of the display unit,
   wherein an upper limit value of a displaying number of the lower level windows is settable; and
   when the display control unit displays a new lower level window as the number of a plurality of lower level windows being displayed on the display surface reaches the upper limit value, the display control unit closes one of the lower level windows which has been displayed hitherto and displays the new lower level window.

2. The operation screen display device as claimed in claim 1, wherein when an operation key in the operation screen of the lower level window is selected, a process associated with the operation key is executed.

3. The operation screen display device as claimed in claim 1, wherein the lower level window displays all operation keys included in an operation screen regardless of the specified size, the operation screen being displayed while being reduced at a magnification that depends on the specified size.

4. The operation screen display device as claimed in claim 1, wherein the lower level window displays a partial or an entire region of an operation screen that depends on the specified size, the operation screen including an operation key at a fixed magnification that does not depend on the specified size.

5. The operation screen display device as claimed in claim 1, wherein the display control unit shifts an operation screen of the lower level window in response to an input operation by a user for specifying a moving direction relative to the lower level window.

6. The operation screen display device as claimed in claim 1, wherein
   the input unit is a touch panel which is arranged superimposed on the display surface of the display unit;
   the predetermined operation for an operation key is a touch operation by a user for an operation key of an operation screen displayed on the display surface and a predetermined gesture operation carried out in succession to the touch operation; and
   the size is specified based on an operation amount of the gesture operation.

7. The operation screen display device as claimed in claim 1, wherein
   a setting of valid or invalid of a display selecting mode to display a lower level window by a user is acceptable;
   a size determining unit that determines the size of the lower level window is further provided when operations of setting the display selecting mode to be valid and specifying an operation key are carried out as the predetermined operation for the operation key; and
   the display control unit displays the lower level window at a size determined by the size determining unit.

8. The operation screen display device as claimed in claim 1, wherein when the input unit accepts a predetermined operation for an operation key in an operation screen of the lower level window, the display control unit displays a second lower level window, in which at least a partial region of an operation screen of a further lower level layer than the operation screen of the lower level window associated with the operation key for which the predetermined operation is performed is displayed, on the display surface at a size specified according to the predetermined operation.

9. The operation screen display device as claimed in claim 1, wherein a plurality of the lower level windows are displayable on the display surface of the display unit.

10. The operation screen display device as claimed in claim 9, wherein the plurality of lower level windows are arranged to be exclusive to each other on the display surface, and a size of other lower level windows displayed hitherto is reduced according to an arrangement position of a lower level window which is displayed last.

11. The operation screen display device as claimed in claim 1, wherein
   when the predetermined operation on a display frame which is arranged at a periphery of a display region of the lower level window is accepted by the input unit, the display control unit changes the size of the lower level window.

12. An operation screen display device comprising:
   a display unit;
   a display control unit that displays any of a plurality of operation screens having a hierarchical structure on a display surface of the display unit; and
   an input unit that accepts an operation by a user; wherein
   when the input unit accepts a predetermined operation for any of a plurality of images in the operation screen, the display control unit displays a lower level window, in which at least a partial region of an operation screen of a lower level layer associated with the image for which the predetermined operation is performed is displayed, on the display surface at a size specified according to the predetermined operation,
   wherein the predetermined operation is a tap operation, and wherein when the predetermined operation anywhere on a display frame which is arranged at a periphery of a display region of the lower level window is accepted by the input unit, the display control unit closes the lower level window.

13. The operation screen display device as claimed in claim 12, wherein when the lower level window is closed, a lower level window of the lower level layer than the lower level window is simultaneously closed.

14. A non-transitory computer-readable recording medium which stores a display program for causing a computer to execute a method for displaying an operation screen, the method comprising the steps of:
 displaying one operation screen of a plurality of operation screens which have a hierarchical structure on a display surface of a display unit of an image forming apparatus configured to print, each operation screen having operation keys for carrying out setting and selection of printing functions to be executed in the image forming apparatus;
 accepting a predetermined operation by a user for any of a plurality of operation keys in the operation screen; and
 displaying, by a display control unit, a lower level window, in which at least a partial region of an operation screen of a lower level layer associated with the operation key for which the predetermined operation is performed is displayed, on the display surface at a size specified according to the predetermined operation,
 wherein a plurality of the lower level windows are displayable on the display surface of the display unit,
 wherein an upper limit value of a displaying number of the lower level windows is settable; and
 when the display control unit displays a new lower level window as the number of a plurality of lower level windows being displayed on the display surface reaches the upper limit value, the display control unit closes one of the lower level windows which has been displayed hitherto and displays the new lower level window.

15. The operation screen display device as claimed in claim 12, wherein when an image in the operation screen of the lower level window is selected, a process associated with the image is executed.

16. The operation screen display device as claimed in claim 12, wherein the lower level window displays all images included in an operation screen regardless of the specified size, the operation screen being displayed while being reduced at a magnification that depends on the specified size.

17. The operation screen display device as claimed in claim 12, wherein the lower level window displays a partial or an entire region of an operation screen that depends on the specified size, the operation screen including an image at a fixed magnification that does not depend on the specified size.

18. The operation screen display device as claimed in claim 12, wherein the display control unit shifts an operation screen of the lower level window in response to an input operation by a user for specifying a moving direction relative to the lower level window.

19. The operation screen display device as claimed in claim 12, wherein
 the input unit is a touch panel which is arranged superimposed on the display surface of the display unit;
 the predetermined operation for the image is a touch operation by a user for an image of an operation screen displayed on the display surface and a predetermined gesture operation carried out in succession to the touch operation; and
 the size is specified based on an operation amount of the gesture operation.

20. The operation screen display device as claimed in claim 12, wherein
 a setting of valid or invalid of a display selecting mode to display a lower level window by a user is acceptable;
 a size determining unit that determines the size of the lower level window is further provided when operations of setting the display selecting mode to be valid and specifying the image are carried out as the predetermined operation for the image; and
 the display control unit displays the lower level window at a size determined by the size determining unit.

21. The operation screen display device as claimed in claim 12, wherein when the input unit accepts a predetermined operation for an image in an operation screen of the lower level window, the display control unit displays a second lower level window, in which at least a partial region of an operation screen of a further lower level layer than the operation screen of the lower level window associated with the image for which the predetermined operation is performed is displayed, on the display surface at a size specified according to the predetermined operation.

22. The operation screen display device as claimed in claim 12, wherein a plurality of the lower level windows are displayable on the display surface of the display unit.

* * * * *